United States Patent
Tsugeno et al.

(10) Patent No.: US 6,782,304 B1
(45) Date of Patent: Aug. 24, 2004

(54) LEARNING CONTROL APPARATUS FOR A REVERSING ROLLING MILL

(75) Inventors: Masashi Tsugeno, Tokyo (JP); Mitsuhiko Sano, Kanagawa-ken (JP); Naoki Yamaguchi, Tokyo (JP); Masaki Hioka, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 875 days.

(21) Appl. No.: 09/616,938

(22) Filed: Jul. 14, 2000

(30) Foreign Application Priority Data

Jul. 15, 1999 (JP) .......................................... P11-202031

(51) Int. Cl.[7] .............................................. G06F 19/00
(52) U.S. Cl. .......................... 700/149; 700/32; 700/89; 702/105
(58) Field of Search ........................... 700/149, 32, 89; 702/105

(56) References Cited

U.S. PATENT DOCUMENTS 3,694,636 A * 9/1972 Smith, Jr. .................. 700/149
4,745,556 A * 5/1988 Turley ........................ 700/149

* cited by examiner

*Primary Examiner*—Leo Picard
*Assistant Examiner*—Sheela S Rao
(74) *Attorney, Agent, or Firm*—Foley & Lardner

(57) ABSTRACT

A learning control apparatus in a reversing rolling mill is disclosed. The learning control apparatus adds a learning calculation means that performs learning calculations based on actual values in the previous pass so as to be able to cope with the pass schedule composition peculiar to the reversing rolling mills. Furthermore, by storing learning calculation values of model errors that depend on materials and product dimensions in tables prepared group division by group division that can assimilate intrinsic model errors, the learning control apparatus of the present invention makes possible stable operation and improves accuracy of the product.

4 Claims, 2 Drawing Sheets

LEARNING CONTROL APPARATUS FOR A REVERSING ROLLING MILL

BACKGROUND OF THE INVENTION

1. Field of the Invention

The present invention relates to a learning control apparatus for a reversing rolling mill that rolls strip, etc. using the reversing method.

2. Description of the Related Art

In a rolling mill that rolls strip, etc. using the reversing method, highly accurate maintenance of the set up values in each pass is essential for stable operation, and set up calculation systems and learning controls that use various mathematical models are widely employed for that purpose. In the case of rolling using the reversing method, the set up calculation is generally executed by a process computer; an optimum pass schedule calculation for the strip delivery thickness for each pass is carried out for processing optimisation, and the various set up values required in the operation of the mill for each pass are calculated. For example, such settings as the roll gap for each pass, the strip threading speed, the running speed, the tail-out speed, and the side guides and roll coolant flow are calculated as these setting values, and these data are transmitted to lower level controllers.

In order to achieve stable operation at such a time, highly accurate prediction of the various quantities by mathematical models is a basic requirement. However, actual rolling operations are affected by all kinds of disturbance factors due to intermittent conditions. Thus, however carefully constructed a mathematical model may be, it will not be possible completely to grasp the actual conditions and numerically to express them.

Therefore, in order to reflect in model prediction various disturbance factors such as disturbances that vary in a time series fashion, learning control is generally applied to the mathematical models. With relation to learning control for reversing rolling mills, various methods have been proposed up to the present time, and each has had some effect.

For example, a "Plate Rolling Method" that rolls while adding corrections so that the settings will be optimum for the next pass by measuring the actual values at each pass midway through the rolling pass and making learning calculations using those results has been disclosed in Laid-Open Patent No. Heisei 7-60320 Gazette. In the method stated in this Gazette, since rolling is continued while measuring actual values midway through a rolling pass and sequentially adding corrections so that the set up for the next pass are optimum, the measurement results of the actual values for each pass in rolling the relevant strip can be reflected in the calculation of the setting values for the next pass. However, there is the problem that errors that are not sequentially present in a pass in time series fashion cannot be reflected in the rolling of the next strip.

Also, a "A Reversing Type Rolling Method That Excels In Configuration And Strip Thickness Control" that, for the second pass and thereafter, performs rolling while repeating the learning, during or immediately after the rolling of each pass, of corrections to the pass schedule up to the final pass based on load forecast expressions learned from the previous pass, in almost the same way as in the above Gazette, has been disclosed in Laid-Open Patent No. Heisei 8-243614 Gazette.

With this Gazette also, learning calculations can be performed based on the calculation results of the actual values for each pass and these results can be reflected in the settings for the next and subsequent passes. However, there is the problem that, even though they may be time series-wise, errors that do not continue in every pass cannot always appropriately be taken into consideration.

At the same time, methods are disclosed in Laid-Open Patent No. Heisei 2-137606 Gazette and Laid-Open Patent No. Heisei 4-367901 Gazette that assimilate model errors that depend on the material being rolled or processed, its target dimensions, etc. out of changes of state that are not time series dependent by storing them in tables prepared group by group. However, even though intrinsic model errors that depend on the material and target dimensions can be assimilated by these methods, this is nothing more than the assimilation of errors as statistical results, and there is the problem that time series errors that do not sequentially depend on passes cannot be assimilated.

As explained above, with the methods disclosed in the above several Gazettes, it is possible effectively to learn model errors that arise sequentially in each pass and intrinsic model errors dependent on materials, target dimensions, etc. when using each method, and there may be cases when product qualities such as strip thickness, strip crown and flatness are well maintained. However, there was the problem of how to assimilate factors other than the above-mentioned model errors, that is to say errors that, though they are time series type errors, are not sequentially dependent in each pass, in order further to maintain stable model forecast accuracy and improve product quality.

The reasons why a satisfactory product quality cannot be achieved solely by assimilation of model errors arising sequentially in each pass and intrinsic model errors depending on the material and the target dimensions using learning calculations for each individual error, as mentioned above, are as follows.

That is to say, a pass schedule in a reversing rolling mill composed of 1~N passes, taking N as an integer of 2 or more, is generally made up of several parts such as initial stage passes—intermediate passes—final stage passes or rough passes—finishing passes, and the essential points for the operations in the passes pertinent to each part differ. For example, with the initial stage passes, the pass schedule is determined so that the roll force is increased for a few passes in order to improve productivity while, conversely, with the final stage passes, it is normal to correct the pass schedule in order to satisfy different aims from those of the initial stage passes, such as ensuring the surface quality of the product.

Consequently, for example, operating conditions such as the reduction (percent draft) rate limits for each pass differ in each part and, naturally, the behavior of the model errors will differ according to those parameter limits. Therefore this means that, with learning calculations that are performed at each relevant pass, the problem will remain that it is not possible satisfactorily to assimilate time series model errors. In fact, since variations with passage of time, such as roll surface state, appear as behavior such as the coefficient of friction gradually varying in time series fashion with the progress of a pass, a method that reflects in the model calculation for the next pass the results of learning by measurement of actual values in a pass will be effective. On the other hand, since the behavior of model errors for material deformation resistance and the like is not simple, cases will often be observed in which the results of time series-wise learning calculations using the actual values of the previous pass do not necessarily operate toward assimilation of the model errors of the next pass.

Also, while on the one hand it is possible, by taking some amount of time, to assimilate the medium-term and long-term fluctuations of model errors by the method of storing the results of learning calculations in tables divided into groups for every material and product dimension, it is not possible to assimilate the minute fluctuations of model errors that occur in successive products in the operations of one day. That is to say, in reversing rolling, rolling is based on pre-stored pass schedules or based on optimum pass schedules that are generated by logic. If, at that time, there are not sufficiently many opportunities for renewing one by one the learning calculation values that belong to the same group division, and also if group division tables that are subdivided to that extent are not prepared, there will, conversely, be many cases when the fluctuations of model errors in the medium term or long term cannot be stabilized and assimilated.

The above type of problems occur because, with a method that sequentially assimilates the model errors of the next pass based on the actual values of the previous pass, the pass schedule composition for a reversing rolling mill is not always uniform. Consequently, neither can model error behavior be completely assimilated by just applying the learning calculation values based on the actual values for the previous pass to the model calculations for the next pass.

On the other hand, with the method of assimilating the intrinsic model errors in the medium term or the long term, for example, fluctuations of model errors such as occur during one day's operations cannot be assimilated sufficiently rapidly. Also, in particular, the fact that there are many cases when, due to the pass schedule composition for a reversing rolling mill not always being uniform, the method of performing learning calculations based on the actual values in the previous pass and sequentially assimilating the model errors of the next pass does not work effectively is a great inherent problem, with its possibility of adversely affecting stable model prediction and, in turn, leading to instability in operations as a whole.

SUMMARY OF THE INVENTION

Accordingly, one object of the present invention is to provide a novel learning control apparatus in a reversing rolling mill in order to solve such problems. The learning control apparatus of the present invention adds a learning calculation means that performs learning calculations based on actual values in the previous pass so as to be able to cope with the pass schedule composition peculiar to reversing rolling mills, sequentially assimilates model errors of the next pass and, at the same time, after completion of rolling of the rolling strip currently being rolled (hereafter also called "the strip concerned"), is able to reflect the learning calculation values in the i passes of the previously rolled rolling strip (hereafter also called "the previous strip") in the model calculations in the i passes of the rolling strip next to be rolled (hereafter also called "the next strip"). Furthermore, by storing learning calculation values of medium-term or long-term model errors that depend on materials and product dimensions in tables prepared group division by group division that can assimilate intrinsic model errors, the learning control apparatus of the present invention makes possible the performance of stable operation and, moreover, can also improve the quality accuracy of the product.

In order to achieve the above object, the present invention has the following composition. That is to say, in a learning control apparatus for a reversing rolling mill that, when controlling a reversing rolling mill in performing the rolling of N passes, taking N as an integer of 2 or more, computes the required setting values for the mill operation of each pass by performing an optimum pass schedule calculation using a mathematical model and, at the same time applying learning control, the present invention has the characteristic of providing:

N in number actual data gathering means that, taking i as any pass out of 1~N passes, collect the actual values obtained in pass i rolling after the current material has been respectively rolled in the i passes, find actual-calculated values by executing model calculations in every pass i using these actual values, and store these actual values and actual-calculated values;

(N−1) in number pass to pass learning calculation means that include:

a pass 1 pass to pass learning calculation means that, from among the actual data gathering means, computes a learning term that assimilates a pass to pass 1 model error based on the actual value and the actual-calculated value stored in the pass 1 actual data gathering means, and stores this learning term, and pass i pass to pass learning calculation means that, taking any pass from among 2~(N−1) passes as pass i, compute learning terms that assimilate the model errors of sequential pass to passes i based on the actual values and actual-calculated values that are stored in the respective pass i actual data gathering means together with the learning term for pass 1 that is stored in the pass 1 pass to pass learning calculation means, and store these learning terms;

(N−1) in number next pass set up calculation means that sequentially compute the required setting values for the operation of the mill for 2~N passes based on the learning terms respectively stored in the (N−1) in number pass to pass learning calculation means; N in number direct pass to pass learning calculation means that compute learning terms that assimilate the errors for the next material from pass 1 to pass N based on the actual values and actual-calculated values for pass 1 to pass N of the current material that are respectively stored in the N in number actual data gathering means;

a lot to lot learning calculation means that, based on the model actual values and actual-calculated value s for each pass i from pass 1 to pass N of the current material that are respectively stored in the N in number actual data gathering means, educes the model error parts that depend on the material and product dimensions, finds a learning term that assimilates the lot to lot model errors, and stores this learning term in a table, and N in number next material pass setting means that, taking N as an integer of 2 or more, and based on the learning terms that are stored in the direct pass to pass learning calculation means and the learning term stored in the lot to lot learning calculation means, sequentially computes the required setting values for the operation of the mill for each pass from pass 1 to the final pass for the next material, and after completion of the rolling of pass 1 of the current material, of executing the rolling of pass 2 onwards in conformity with the setting values of the next pass set up calculation means and executing the rolling of pass 1 to pass N for the next material in conformity with the setting values of the next material pass set up means.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
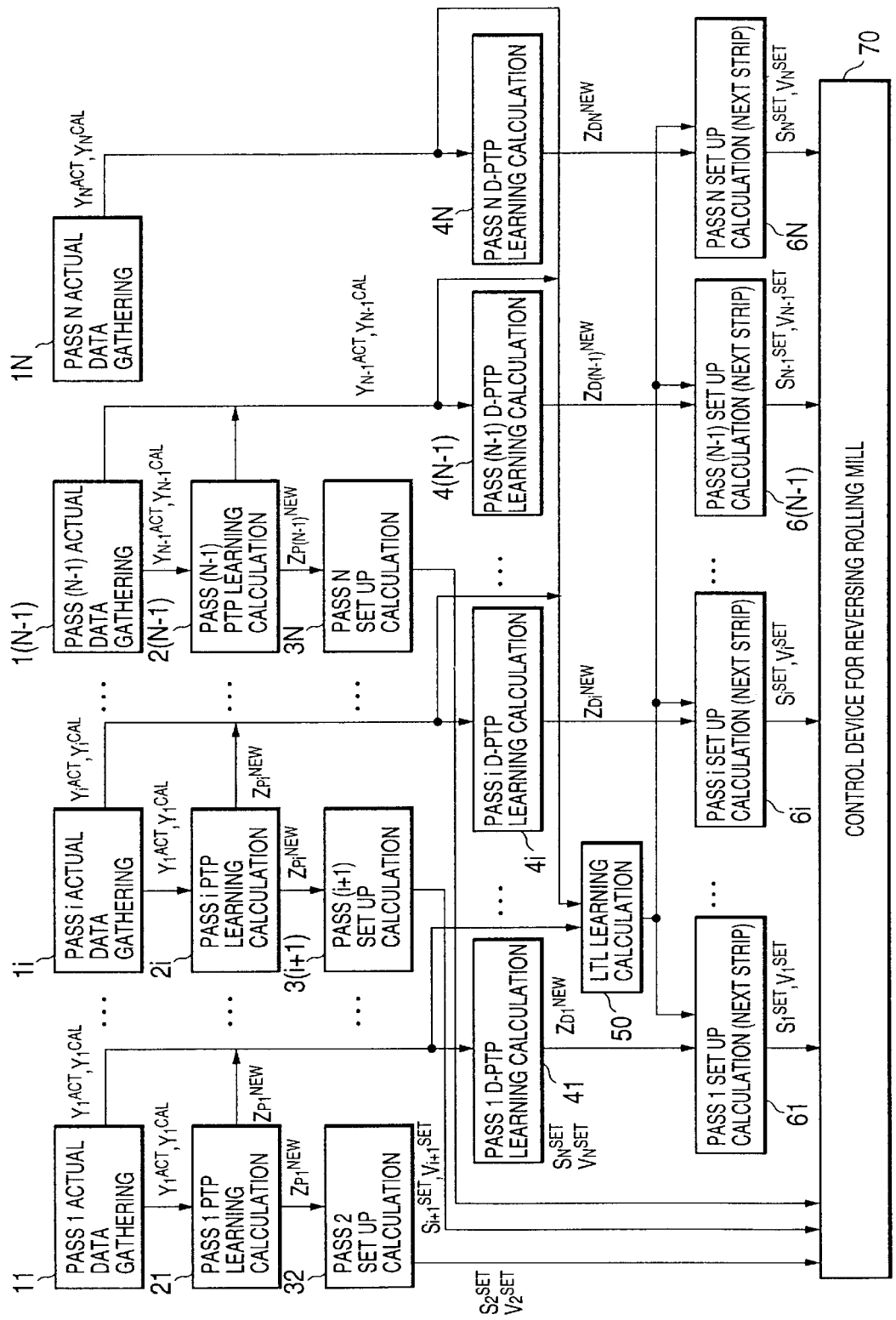
FIG. 1 is a block diagram showing the composition of an embodiment of the learning control apparatus for a reversing rolling mill concerned in the present invention.

Referring now to the drawings, wherein like reference numerals designate identical or corresponding parts throughout the several views, and more particularly to FIG. 1 thereof, one embodiment of the present invention will be described.

FIG. 1 is a block diagram showing the composition of a learning control apparatus that implements the learning control method for reversing rolling mills concerned in the present invention. This embodiment is an example of a composition for a total of N passes. Pass 1 actual data gathering means (hereinafter is sometimes called device) 11, ..., pass i actual data gathering means 1i, ..., pass (N−1) actual data gathering means 1(N−1) and pass N actual data gathering means 1N are provided to correspond respectively to pass 1, ..., pass i, ..., pass (N−1) and pass N. These pass i (i=1~N) actual data gathering means 1i, ..., compute the respective pass i actual values $Y_i^{ACT}$ and pass i actual-calculated values $Y_i^{CAL}$.

Also, with the exception of pass N actual data gathering means 1N, respective pass 1 pass to pass (Pass To Pass is hereafter abbreviated as PTP) learning calculation means 21, ..., pass i PTP learning calculation means 2i, ..., and pass (N−1) PTP learning calculation means 2(N−1) that execute pass to pass learning, which is described in detail below, are connected to pass 1 actual data gathering means 11, pass i actual data gathering means 1i, ..., and pass (N−1) actual data gathering means 1(N−1). Of these, pass 1 PTP learning calculation means 21 finds pass 1 PTP learning term $Z_{P1}^{NEW}$, based on pass 1 actual value $Y_1^{ACT}$ and pass 1 actual-calculated value $Y_1^{CAL}$. Other than this, pass i PTP learning calculation means 2i (i=2~(N−1)) find pass i PTP learning terms $Z_P^{NEW}$, based on the respective pass i actual values $Y_i^{ACT}$ and pass i actual-calculated value s $Y_i^{CAL}$ and also on PTP learning term $Z_{P(i-1)}^{NEW}$ that is found by PTP learning computation means 2(i−1).

Moreover, strip concerned pass 2 set up calculation means 32, ..., 3(i+1), ..., and 3N, which reflect the respective pass i PTP learning terms $ZP_i^{NEW}$ in the model calculations in the pass (i+1) set up calculations and set roll gap setting values $S_{(i+1)}^{SET}$ and roll peripheral speed set up values $V_{(i+1)}^{SET}$ for pass (i+1) in reversing rolling mill control device 70, are connected to pass i PTP learning calculation means 2i (i=1~(N−1)).

Also, pass 1 direct pass to pass (Direct Pass To Pass is hereafter abbreviated as D-PTP) learning calculation means 41, ..., pass i D-PTP learning calculation means 4i, ..., pass (N−1) D-PTP learning calculation means 4(N−1) and pass N D-PTP learning calculation means 4N that, as described in detail below, perform D-PTP learning calculations for pass i (i=1~N) of the next material from pass i of the current material based on the pass i actual values $Y_i^{ACT}$ and the pass i actual-calculated value s $Y_i^{CAL}$ and output learning terms $Z_{Di}^{NEW}$, are respectively connected to pass 1 actual data gathering means 11, ..., pass i actual data gathering means 1i, ..., (N−1) pass actual data gathering means 1(N−1) and pass N actual data gathering means 4N.

Furthermore, strip concerned lot to lot (Lot To Lot is hereafter abbreviated as LTL) calculation means 50 is connected to pass 1 actual data gathering means 11, ..., pass i actual data gathering means 1i, ..., pass (N−1) actual data gathering means 1(N−1) and pass N actual data gathering means 1N, and finds LTL learning terms by inputting the actual values $Y_i^{ACT}$ and the actual-calculated values $Y_i^{CAL}$ for each pass from pass 1 to final pass N that are the respective outputs of these actual data gathering means and, based on these inputted values, performing LTL computations that educe the intrinsic model error portions that depend on the material and product dimensions, as described in detail below.

Also, next strip pass 1 set up calculation device 61, ..., next strip pass i set up calculation device 6i, ..., next strip pass (N−1) set up calculation device 6(N−1) and next strip pass N set up calculation device 6N are connected respectively to pass 1 D-PTP learning calculation means 41, ..., pass i D-PTP learning calculation means 4i, ..., pass (N−1) D-PTP learning calculation means 4(N−1) and pass N D-PTP learning calculation means 4N and, taking as inputs, on the one hand, the various learning terms $Z_{Di}^{NEW}$ that are the respective outputs of the D-PTP learning calculation means and, on the other hand, the LTL learning term $Z_L^{NEW}$ of strip concerned LTL calculation means 50, sets roll gap $S_i^{SET}$, roll peripheral speed $V_i^{SET}$, etc. that are the initial setting values for each pass for the next strip, and applies these to reversing rolling mill control device 70.

The operation of the present embodiment composed in the above manner will be described below.

First, after rolling pass 1 of the current material (that is to say, the current strip), pass 1 actual data gathering device 11 collects the actual values obtained in the pass 1 rolling, and computes pass 1 actual value $Y_1^{ACT}$ and pass 1 actual-calculated value $Y_1^{ACT}$. Pass 1 PTP learning calculation device 21 performs a PTP learning calculation for pass 1 based on the computed pass 1 actual value $Y_1^{ACT}$ and pass 1 actual-calculated value $Y_1^{CAL}$, and finds PTP learning term $Z_{P1}^{NEW}$ for pass 1. Strip concerned pass 2 set up calculation device 32 reflects this PTP learning term $Z_{P1}^{NEW}$ for pass 1 in the model calculation in the pass 2 set up calculation and, based on that calculation result, for instance, sets roll gap setting value $S_2^{SET}$, roll peripheral speed setting value $V_2^{SET}$, etc. in reversing rolling mill control device 70.

Next, after the respective rolling passes i of the current material, the pass i actual data gathering means 1i, other than pass 1 actual data gathering means 11, compute the pass i actual values $Y_i^{ACT}$ and pass i actual-calculated value s $Y_i^{CAL}$ obtained by pass i rolling. Then pass i PTP learning calculation means 2i (i=2~(N−1)) perform pass i PTP learning calculations, based on the respective pass i actual values $Y_i^{ACT}$ and pass i actual-calculated value s $Y_i^{CAL}$ together with pass (i-1) PTP learning term $Z_{P(i-1)}^{NEW}$, and find pass i PTP learning terms $Z_{Pi}^{NEW}$. Then strip concerned pass (i+1) set up calculation means 3(i+1) (i=1~(N-1)) reflect the respective pass i PTP learning terms $Z_{Pi}^{NEW}$ in model calculations in pass (i+1) set up calculations and, based on those calculation results, for instance, set roll gap setting values $S_{(i+1)}^{SET}$, roll peripheral speed setting values $V_{(i+1)}^{SET}$, etc. in reversing rolling mill control device 70.

PTP learning calculations are performed based on the actual data for each pass sequentially from pass 1 in this way. After the rolling of pass (N-1), the actual data obtained in pass (N-1) rolling are collected and pass (N-1) actual value $Y_{(N-1)}^{ACT}$ and pass (N-1) actual-calculated value $Y_{(N-1)}^{CAL}$ are computed. Then, based on pass (N-1) actual value $Y_{(N-1)}^{ACT}$ and pass (N-1) actual-calculated value $Y_{(N-1)}^{CAL}$ together with pass (N-2) PTP learning term $Z_{P(N-2)}^{NEW}$, a PTP learning calculation is performed and pass (N-1) PTP learning term $Z_{P(N-1)}^{NEW}$ is found. This PTP learning term $Z_{P(N-1)}^{NEW}$ is reflected in a model calculation in the pass N set up calculation, and, based on that calculation result, strip concerned pass N set up calculation means 3N, for instance, sets roll gap setting value $S_N^{SET}$, roll peripheral speed setting value $V_N^{SET}$, etc. in reversing rolling mill control device 70.

Here, all the model calculations for the various setting values required up to the pass N rolling of the current material (strip) have been completed. At the point in time when the pass N rolling is completed, the actual data obtained in pass N rolling are collected and pass N actual values $Y_N^{ACT}$ and pass N actual-calculated values $Y_N^{CAL}$ are computed. Based on the pass i actual values $Y_i^{ACT}$ and actual-calculated values $Y_i^{CAL}$ that were obtained by the actual data gathering functions from pass 1 to final pass N, pass i D-PTP learning calculation means 4i (i=1~N) perform D-PTP learning calculations with regard to the i passes of the next strip from the i passes of the current material, and find D-PTP learning terms $Z_{D1}^{NEW}$~$Z_{DN}^{NEW}$ for pass 1 to pass N.

At the same time, strip concerned material LTL calculation means 50 executes learning calculations that educe the intrinsic model error portions dependent on material and product dimensions, based on the pass i actual values $Y_i^{ACT}$ and actual-calculated values $Y_i^{CAL}$ for pass 1 to final pass N, and finds LTL learning terms $Z_L^{NEW}$.

Next, next strip pass 1 set up calculation means 61, . . . , next strip pass i set up calculation means 6i, . . . , next strip pass (N-1) set up calculation means 6(N-1) and next strip pass N set up calculation means 6N reflect the D-PTP learning terms $Z_{D1}^{NEW}$~$Z_{DN}^{NEW}$, outputted from the respective corresponding pass 1 D-PTP learning calculation means 41, . . . , pass i D-PTP learning calculation means 4i, . . . , pass (N-1) D-PTP learning calculation means 4(N-1) and pass N learning calculation means 4N, and LTL learning term $Z_L^{NEW}$ computed by strip concerned LTL calculation means 50, and these are the initial settings for each pass of the next strip. For example, roll gap setting values $S_i^{SET}$, roll peripheral speed setting values $V_i^{SET}$, etc. are set in reversing rolling mill control device 70, and rolling of the next strip is commenced at a specified timing.

Figure 2:
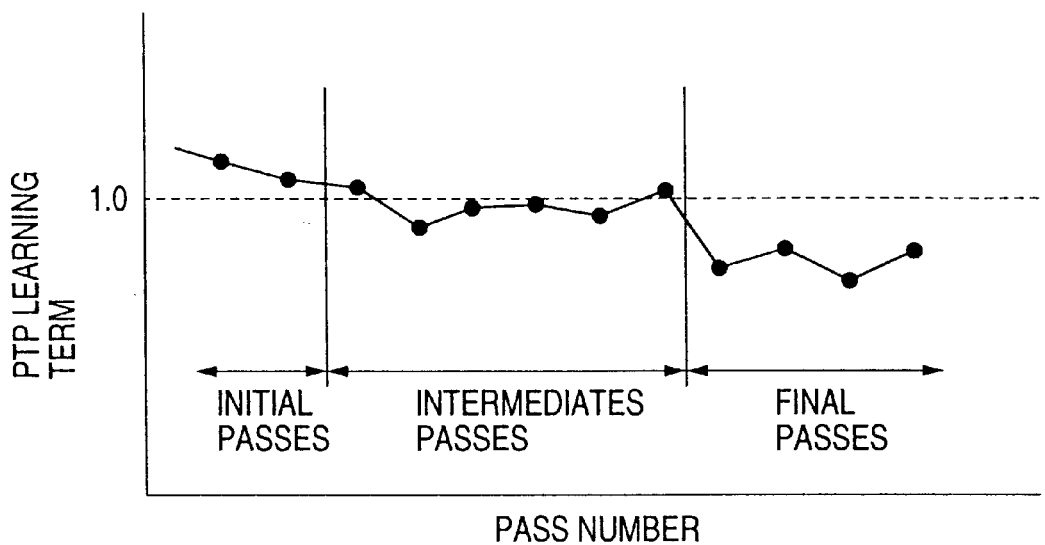
FIG. 2 is a graph showing the relationship between pass number and pass to pass learning term, in a case where the pass schedule can be divided into the three domains of initial stage passes, intermediate passes and final stage passes, to illustrate the operation of the embodiment shown in FIG. 1.

Here, the variation behavior of each learning term will be described. First, of the three types of learning term, that is to say PTP learning terms, D-PTP learning terms and LTL learning terms, mentioned in this embodiment, that which exhibits the most fundamental and short-term model error behavior is the current value of the PTP learning term. Here, the current value $Z_P^{CUR}$ of the PTP learning term is a quantity calculated by $Z_P^{CUR}=Y^{ACT}/Y^{CAL}$. FIG. 2 shows an example of the typical behavior of the current value $Z_P^{CUR}$ of the PTP learning term.

In FIG. 2, a case has been shown in which the pass schedule can be divided into the three domains of initial stage passes, intermediate passes and final stage passes. As is clear from the drawing, the behavior of the current value $Z_P^{CUR}$ of the PTP learning term undergoes the influence of time series factors and, at the same time, its numerical value differs according to the various domains. This means that the current value of the PTP learning term in fact manifests state variations of rolling phenomena such as roll surface state and, at the same time, is also affected by the intrinsic error factors of the model.

In other words, with the example in FIG. 2, since the pass reduction differs with each pass in the initial stage passes, the intermediate passes and the final stage passes, there are times when the model calculation values that use the pass reduction in those pass reduction domains will exhibit a tendency toward individually differing errors. This is error behavior that, fundamentally, LTL learning functions that have prepared tables group by group should assimilate. However, although the tables are group by group, because they are of digitized key composition, they are completely smooth in form, and this leads to the assimilation of these errors being impossible.

Therefore, by carrying out D-PTP learning calculations based on the behavior of current value $Z_P^{CUR}$ of the PTP learning term for each pass with the next strip, it becomes possible to improve the accuracy of the model calculations in the set up calculations for the next strip.

For example, the basic composition of the smoothing process in the PTP learning calculation is as in the following expression.

$$Z_P^{NEW}=Z_P^{OLD}+\beta_P \cdot (z_P^{CUR}-Z_P^{OLD}) \quad (1)$$

Here, $Z_P^{NEW}$ is the learning term for the learning calculation result in the pass concerned, and this is directly used in the model calculation in the set up calculation for the next pass. $Z_P^{CUR}$ is the current value of the learning calculation in the pass concerned, in other words it is a positive numerical value that compares the actual value with the actual-calculated value, and shows the model error itself. Moreover, $Z_P^{OLD}$ is the learning calculation result in the previous pass, and is the learning term that has already been used in the model calculation in the set up calculation for the pass concerned. Also, $\beta_P$ is the smoothing gain, and the larger $\beta_P$ becomes, the more the correction portion of the model error for the relevant pass is reflected with regard to the set up calculation for the next pass.

Similarly, the smoothing processes for the D-PTP learning calculation and the LTL learning calculation are also executed by the following expressions.

$$Z_D^{NEW}=Z_D^{OLD}+\beta_D \cdot (Z_D^{CUR}-Z_D^{OLD}) \quad (2)$$

$$Z_L^{NEW}=Z_L^{OLD}+\beta_L \cdot (Z_L^{CUR}-Z_L^{OLD}) \quad (3)$$

Here, $Z_D^{NEW}$ is the learning term for the D-PTP learning calculation results in each pass for the strip concerned, and this is directly used in the model calculations in the set up calculations for each pass for the next strip. Also, $Z_D^{OLD}$ is, similarly, the D-PTP learning term that was used in the set up calculations in each pass of the previous strip. Moreover, $Z_D^{CUR}$ is the current value of the D-PTP learning calculation.

At the same time, $Z_L^{NEW}$ is the learning term for the LTL learning result of the strip concerned, and this is directly used in the model calculations in the set up calculations for the next strip. Also, $Z_L^{OLD}$ is, similarly, the LTL learning term that was used in the set up calculations for the previous strip. Moreover, $Z_L^{CUR}$ is the current value of the LTL learning expression. $\beta_D$ and $\beta_L$ are the respective learning calculation gains.

In this way, the three types of learning calculation are executed at respective individual timings. Consequently, it is necessary to consider the respective previous strip values in the calculation of the three types of current value. In other words, in relation to the frequency of the timing of learning calculations, the PTP learning calculations that are carried out after completion of the rolling of each pass or immediately before commencement of rolling of the next pass are the most frequent and, following that, the frequency of the D-PTP learning calculations, which are always executed at the point in time of completion of the rolling of one strip of material, is high. Furthermore, the LTL learning calculations are executed at the point in time at which the rolling of one strip of material is completed in cases when, the strip concerned and the previous strip being of different lots according to the lot judgement conditions such as the product specifications of the strip concerned and the previous strip, the learning term of the lot to which the strip concerned belongs has reached the timing at which it should be renewed.

Consequently, when finding the current values of PTP learning calculations or D-PTP learning calculations, it is necessary to take into consideration values for the previous strip of a learning expression of a higher order than these. Now, suppose that each learning term is compensated in the form of a product for the model expression. That is to say, let us take it that the model is expressed by the following expression.

$$Y=f(x) \quad (4)$$

Each learning term in the set up calculation is used in the form $$Y=Z_P^{OLD} \cdot Z_D^{OLD} \cdot Z_L^{OLD} \cdot f(x) \quad (5)$$

In other words this means that, when performing compensation by learning terms in the multiplicable form, provided the numerical value of the learning term is 1.0, the model calculated value can be used as it stands.

Here, taking renewal timing into consideration, calculation of the current value of each learning term is performed as follows.

$$Z_L^{CUR} = \frac{Y^{ACT}}{Y^{CAL}} \quad (6)$$

$$Z_D^{CUR} = \frac{Y^{ACT}}{Z_L^{OLD} \cdot Y^{CAL}} \quad (7)$$

$$Z_P^{CUR} = \frac{Y^{ACT}}{Z_D^{OLD} \cdot Z_L^{OLD} \cdot Y^{CAL}} \quad (8)$$

By this means, repeated compensation for each learning term can be avoided.

Also, similarly, suppose that each learning term is compensated in the additive form for the model expression. That is to say, for model expression (4), each learning term is used in the form $$Y=f(x)+Z_P^{OLD}+Z_D^{OLD}+Z_L^{OLD} \quad (9)$$

in the setting expressions. In other words, this means that, when performing compensation by learning terms in the form of sums, provided the numerical value of the learning term is 0.0, the model calculated value can be used as it stands.

Here, taking renewal timing into consideration, calculation of the current value of each learning term is performed as follows.

$$Z_L^{CUR}=Y^{ACT}-Y^{CAL} \quad (10)$$

$$Z_D^{CUR}=Y^{ACT}-Y^{CAL}-Z_L^{OLD} \quad (11)$$

$$Z_P^{CUR}=Y^{ACT}-Y^{CAL}-Z_D^{OLD}-Z_L^{OLD} \quad (12)$$

By this means, repeated compensation for each learning term can be avoided.

On the other hand, in the cases of the PTP learning calculation and the LTL learning calculation, these are not concerned in the pass schedule composition of reversing rolling mills. However, in the case of the D-PTP learning calculation, there is the problem that, if the pass schedule compositions for the strip concerned and the next strip are not the same, the learning calculation value for pass i of the strip concerned cannot directly be used as it stands as the learning term for pass i of the next strip in the set up calculation for the next strip.

This is natural from the fact that the manner of use of the learning calculation and its learning term is based on the actual data for the D-PTP learning calculations. However, since it is fully possible to roll the same lot of material (strip) with different numbers of passes, the method of handling this problem becomes important.

Now, taking the total number of passes for the strip concerned as N and the total number of passes for the next strip as M, let us deal with the case in which N and M are not equal. If the learning terms obtained by the D-PTP learning calculations for the strip concerned, in other words the learning terms that should be used in the set up calculation s for each pass of the next strip, are taken as "NEW values", there are N in number of these "NEW values", namely $Z_{D1}^{NEW}, \ldots, Z_{Di}^{NEW}, \ldots, Z_{DN}^{NEW}$ (i=1~N). These must be developed into the N in number learning terms for the next strip that are required for the set up calculation s for each pass of the next strip, namely $Z_{D1}^{OLD}, \ldots, Z_{Dj}^{OLD}, \ldots, Z_{DM}^{OLD}$ (j=1~M), that is to say "OLD" values. For example, in the case of the subject model being a roll force model, we develop the "NEW" values of the strip concerned D-PTP learning calculations using the following method.

The basic expression of the roll force model is, for example, the following expression.

$$P = \left(1 - \alpha \cdot \frac{t_f}{k_m} - \beta \cdot \frac{t_b}{k_m}\right) \cdot k_m \cdot L_d \cdot B \cdot Q_P \quad (13)$$

Here, P is rolling force, $k_m$ is mean deformation resistance, $L_d$ is projected contact arc length, $t_f$ is forward tension, $t_b$ is backward tension, B is strip width and $Q_P$ is roll force function. Also, $\alpha$ and $\beta$ are respectively the forward tension and backward tension influence coefficients with regard to the force. In the case of compensating this force model with the three types of learning terms, they are used as shown in the following expressions.

$$P=Z_P^{OLD} \cdot Z_D^{OLD} \cdot Z_L^{OLD} \cdot \Gamma \cdot k_m \cdot L_d \cdot B \cdot Q_P \quad (14)$$

$$\Gamma = 1 - \alpha \cdot \frac{t_f}{k_m} - \beta \cdot \frac{t_b}{k_m} \quad (15)$$

Although there actually exist a large number of force model prediction error factors, here, for simplicity, let us assume that the mean deformation resistance $k_m$ has a model error that is present in the domain of accumulated strain $\epsilon_C$, which is one of its variables, and that that model error is dominant in regard to the load model error factors.

Figure 3:
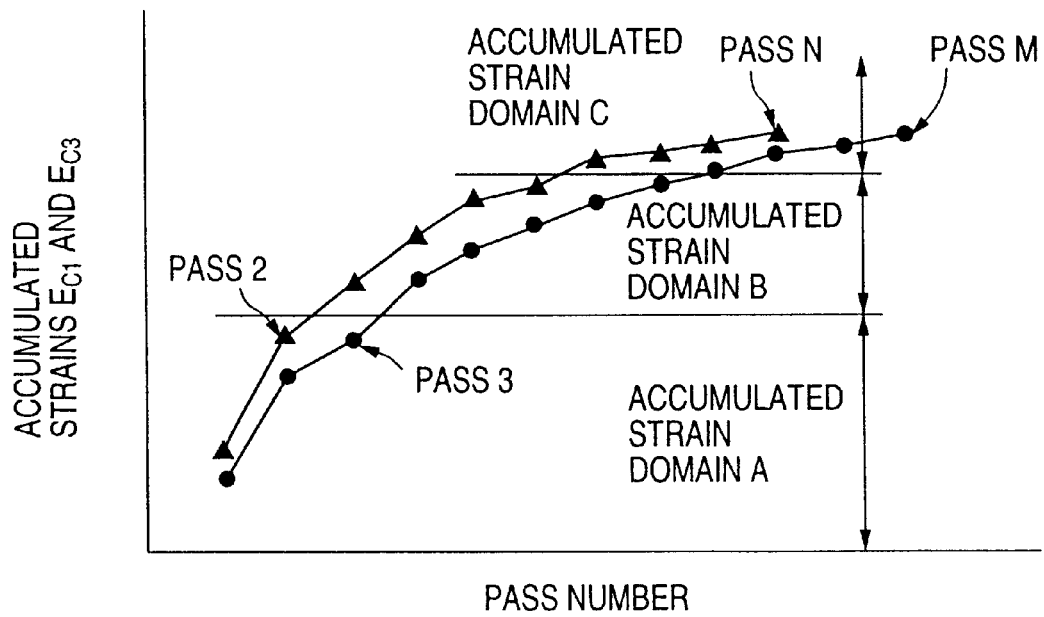
FIG. 3 is a graph showing the relationship between pass number and accumulated strain for two products to illustrate the operation of the embodiment shown in FIG. 1.

Taking the accumulated strain $\epsilon_{Ci}$ (i=1~N) of each pass i in the strip concerned, if the accumulated strain of the j passes (j=1~M) in the following material is taken as $\epsilon_{Cj}$, if the specifications of these two products are almost the same, it is considered that the accumulated strains in the final passes will be almost equal. In other words, $\epsilon_{CN} = \epsilon_{CM}$ FIG. 3 shows typical variations of accumulated strain of the pass schedules for two products. Here, for convenience, the accumulated strain has been divided into 3 domains, A, B and C, but there may be any number of domains.

Now, we shall study the accumulated strain for each pass of the strip concerned in each accumulated strain domain. For instance, in accumulated strain domain A, the accumulated strains for pass 2 of the strip concerned and pass 3 of the next strip are almost the same. Also, the totals of the passes that belong to accumulated strain domain A are 2 for the strip concerned pass schedule and 3 for the next strip pass schedule. Consequently, in accumulated strain domain A, we execute a process of increasing the number of passes from 2 in number to 3 in number, in conformity with accumulated strain $\epsilon_{Ci}$ for each pass. Similarly, in accumulated strain domain B, the number of passes is increased from 4 in number to 5 in number, and in accumulated strain domain C, the number of passes may be left as it is at 4 in number.

Practical computation of the increase/decrease calculation for the number of passes and the pass schedule are executed by the pass schedule processing of the set up calculations. Therefore, here the development of the D-PTP learning terms will be described. In the pass schedule for the next strip, the number of passes in accumulated strain domain A is increased by 1 in number pass. At this time, in pass 1 and pass 2 of the strip concerned, "NEW" values $Z_{D1}^{NEW}$ and $Z_{D2}^{NEW}$ of the corresponding D-PTP learning terms are in existence. The accumulated strains of the passes concerned at this time are $\epsilon_{Ci}$ and $\epsilon_{C2}$. At the same time, if the strains for the next material are taken as $\epsilon^*_{C1}, \epsilon^*_{C2}$ and $\epsilon^*_{C3}$, closest numeric character sets should exist for each of these 5 in number accumulated strains.

Let us assume, for example that these are taken as $$\epsilon_{C1} \approx \epsilon^*_{C1} \quad (16)$$

$$\epsilon_{C2} \approx \epsilon^*_{C3} \quad (17)$$

In this case, $Z_{D1}^{NEW}$ of the strip concerned is applied as $Z_{D1}^{OLD}$ of the set up calculation for pass 1 of the next strip and $Z_{D2}^{NEW}$ is applied as $Z_{D3}^{OLD}$ of pass 3. Then, $Z_{D2}^{OLD}$ of pass 2 of the next strip is found by linear interpolation. In other words, $$Z_{D2}^{OLD} = \frac{\epsilon^*_{C2} - \epsilon^*_{C1}}{\epsilon^*_{C3} - \epsilon^*_{C1}} \cdot (Z_{D3}^{OLD} - Z_{D1}^{OLD}) + Z_{D1}^{OLD} \quad (18)$$

In this way, even in cases in which the numbers of passes for the strip concerned and the next strip differ, by linear interpolation based on the nature of the model expression, it becomes possible to develop "NEW" values for the strip concerned in order to execute the D-PTP learning calculation.

Here, a method has been shown of developing "NEW" values of the D-PTP learning calculation into "OLD" values in regard to the set up calculation s for the next strip by linear interpolation when the numbers of passes for the strip concerned and the next strip differ. However, completely similar results can also be obtained, without recourse to linear interpolation, by performing parameter selection that takes account of the nature of the model expression and using a method developing the model expression into those parameters in a form that considers their dependency.

As is clear from the above description, when using the present invention, in a pass schedule made up of multiple passes, learning calculation values, based on model calculation values that use the actual values and actual-calculated values in pass i, that should improve the accuracy of the model calculation value for the following pass (the (i+1) pass) and that assimilate model errors are sequentially computed after the pass i rolling value or before the commencement value of the next pass (the (i+1) pass), and these learning calculation values are reflected in the model calculations for the next pass. Therefore it becomes possible to assimilate model errors based on factors that vary time series-wise from among the model errors arising in each pass, with the result that the accuracy of model calculations in the set up calculations for the next pass are sequentially improved. Here, moreover, the actual values and actual-calculated values in the i passes are stored.

Next, at the point in time when all the passes in the rolling of one strip of material are completed, or immediately before commencement of rolling of the next strip, the learning calculation values in the i passes of the next strip are calculated based on model calculation values that use the above stored actual values and actual-calculated values in the i passes of the strip concerned, and these learning calculation values are reflected in the model calculations in the i passes of the next strip. Therefore, it becomes possible to assimilate model errors based on factors peculiar to each pass from among the model errors based on factors that vary time series-wise, with the result that the accuracy of model calculations for all passes in the set up calculations of the next strip are improved.

Also, at the point in time when all the passes in the rolling of one strip of material are completed, or immediately before commencement of rolling of the next strip, of the two types of learning calculation values, the intrinsic model error portions that depend on material and product dimensions are computed, and these learning calculations are stored in a table that is prepared in separate group divisions. The result of this is that it becomes possible to assimilate model errors over the long term, and in turn, to maintain stable rolling operation. Thus, it is possible to provide an extremely useful reversing rolling mill learning control apparatus.

Obviously, numerous additional modifications and variations of the present invention are possible in light of the above teachings. It is therefore to be understood that, within the scope of the appended claims, the present invention may be practised otherwise than as specially described herein.

What is claimed is:

1. A learning control apparatus for a reversing rolling mill that, when controlling said reversing rolling mill in performing a rolling of N passes, taking N as an integer of 2 or more, computes required setting values for a mill operation of each pass by performing an optimum pass schedule calculation using a mathematical model and, at the same time applying learning control, comprising:

N in number actual data gathering means that, taking i as any pass out of 1~N passes, collect actual values obtained in pass i rolling after a current material has been respectively rolled in the i passes, find actual-calculated values by executing model calculations in every pass i using said actual values, and store said actual values and actual-calculated values;

(N−1) in number pass to pass learning calculation means that include:

a pass 1 pass to pass learning calculation means that, from among said actual data gathering means, computes a learning term that assimilates a pass 1 pass to pass model error based on said actual value and actual-calculated value stored in said pass 1 actual data gathering means, and stores said learning term, and pass i pass to pass learning calculation means that, taking any pass from among 2~(N−1) passes as pass i, compute learning terms that assimilate model errors of sequential pass to passes i based on said actual values and actual-calculated values that are stored in the respective pass i actual data gathering means together with said learning term for pass 1 that is stored in said pass 1 pass to pass learning calculation means, and store said learning terms;

(N−1) in number next pass set up calculation means that sequentially compute required setting values for an operation of said mill for 2~N passes based on said learning terms respectively stored in said (N−1) in number pass to pass learning calculation means;

N in number direct pass to pass learning calculation means that compute learning terms that assimilate errors for a next material from pass 1 to pass N based on said actual values and actual-calculated values for pass 1 to pass N of a current material that are respectively stored in said N in number actual data gathering means;

a lot to lot learning calculation means that, based on model actual values and actual-calculated values for each pass i from pass 1 to pass N of current material that are respectively stored in said N in number actual data gathering means, educes model error parts that depend on said material and product dimensions, finds a learning term that assimilates lot to lot model errors, and stores said learning term in a table; and N in number next material pass set up means that, taking N as an integer of 2 or more, and based on said learning terms that are stored in said direct pass to pass learning calculation means and said learning term stored in said lot to lot learning calculation means, sequentially computes required setting values for said operation of said mill for each pass from pass 1 to a final pass for said next material, wherein said learning control apparatus executes a rolling of pass 2 onwards in conformity with said setting values of said next pass set up calculation means and executes said rolling of pass 1 to pass N for said next material in conformity with sad setting values of said next strip pass set up means after completion of the rolling of pass 1 of said current material.

2. A learning control apparatus for a reversing rolling mill according to claim 1, wherein:

said (N−1) in number pass to pass learning calculation means, when calculating said learning terms for said material currently being rolled, compensate the relationship of said actual values and said actual-calculated values stored in said actual data gathering means in conformity with said learning terms of said direct pass to pass learning calculation means and said learning terms of said learning calculation means in regard to said rolling material that was rolled immediately before said current rolling material, and said N in number direct pass to pass learning calculation means, when calculating said learning terms for said material currently being rolled, compensate the relationship of said actual values and actual-calculated values stored in said actual data gathering means in conformity with said learning terms of said lot to lot learning calculation means in regard to said rolling material that was rolled immediately before said current rolling material.

3. A learning control apparatus for a reversing rolling mill according to claim 2, wherein:

said N in number direct pass to pass learning calculation means calculate said learning terms next to be rolled by smoothing processing of said learning terms used in set up calculation s for said material currently being rolled and said learning terms for said material currently being rolled.

4. A learning control apparatus for a reversing rolling mill according to claim 2, wherein:

taking an integer of 2 or more as N and a positive integer that differs from N as M, a total number of passes of said material currently being rolled being N and a total number of passes of said material next to be rolled being M, when calculating said learning terms for assimilating errors in regard to the j passes of said material next to be rolled from the i passes of said material currently being rolled, said learning control apparatus computes said learning terms to be used in said j passes of said material next to be rolled by linear interpolation divided domain by divided domain, taking into consideration a parameter composition of a model expression taken as a subject of learning control.

\* \* \* \* \*